United States Patent [19]

Lopata

[11] 4,168,114
[45] Sep. 18, 1979

[54] FILM GATE

[76] Inventor: Ira Lopata, 35 Sutton Pl., New York, N.Y. 10022

[21] Appl. No.: 825,256

[22] Filed: Aug. 17, 1977

[51] Int. Cl.² ............................................. G03B 23/02
[52] U.S. Cl. ...................................... 352/72; 352/224; 242/197
[58] Field of Search ............... 352/221, 224, 72, 78 R; 242/197, 198

[56] References Cited

U.S. PATENT DOCUMENTS

| | | | |
|---|---|---|---|
| 3,410,186 | 11/1968 | Kaneko | 352/72 |
| 3,514,194 | 5/1970 | Ariyasu | 352/72 |
| 3,514,197 | 5/1970 | Sho | 352/72 |
| 3,561,853 | 2/1971 | Thevenaz | 352/123 |
| 3,578,851 | 5/1971 | Jensen | 352/72 |
| 3,601,335 | 8/1971 | Dopkins et al. | 352/72 |

FOREIGN PATENT DOCUMENTS 841102 7/1960 United Kingdom .................... 352/221

Primary Examiner—Monroe H. Hayes
Attorney, Agent, or Firm—Norman N. Popper; Daniel H. Bobis

[57] ABSTRACT

A film gate for being received in a cassette which holds a film strip for projection therefrom; the gate provides stationary tapered guides against which a strip not lying precisely in a preselected focal plane, is cammed toward the preselected focal plane by the tapered guide fingers; an opposed movable guide on a movable portion of the film gate opposite to the stationary guide is provided with arcuate guide fingers to prevent the cammed film strip from moving away from the preselected focal plane.

2 Claims, 10 Drawing Figures

FILM GATE

BACKGROUND OF THE INVENTION

1. Field of Invention

This invention relates to film gates generally, and specifically to film gates which may be embraced by a movable cassette, which film gates contain tapered guide fingers and arcuate guide fingers to normalize the position of a film strip in the cassette and move it to a preselected focal plane.

2. Prior Art

An automatic information retrieval system has been devised as disclosed in U.S. Pat. No. 4,025,176 for storing information on film strips in cassettes, for calling up a cassette containing desired information, for unspooling the film strip from the cassette until a desired frame is automatically located, and then projecting that frame for visual inspection. To enable the user of this system to load cassette with spooled film strips, without the necessity for adhesively securing a leader to the film in accordance with the usual practice, a special leader pin has been devised. (U.S. Pat. No. 4,027,832) The cassette is particularly disclosed in U.S. Pat. No. 3,804,498.

Without a leader strip, the film strip may be limp, and may not be in the focal plane. If the cassette were moved toward a conventional film gate, the limp film which might not lie precisely in the focal plane would encounter a portion of the film gate and be torn, broken, or scratched. In order to avoid such damage resulting from the use of conventional film gates in the present system, it was necessary to devise a means to avoid damage to the film strip.

SUMMARY OF THE INVENTION

It has been found that a film gate may be provided like the conventional film gate, but which includes tapered guide fingers on the stationary portion of the film gate, and arcuate guide fingers on the movable portion of the film gate. Thus when a film strip in a cassette is moved edgewise toward the film gate, the tapered guide fingers on the stationary portion of the gate will cam a deviant film strip toward the focal plane, if perchance the film strip has limply moved from the focal plane. The film strip thus is cammed into alignment with the focal plane, rather than encountering the edge of the stationary portion of the film gate. Likewise, the movable portion of the film gate is provided with arcuate guide fingers which may be encountered by the rising film strip, and the strip will be normalized and guided by the arcuate fingers toward the focal plane. By means of these guide fingers the film does not encounter any tranverse portion of the film gate that would bend, tear or damage it. It is moved to within reasonable proximity of the focal plane where the movable gate moves to seize the film and pin it against the stationary gate precisely in the focal plane.

DRAWINGS

These objects and advantages as well as other objects and advantages may be attained by the device shown by way of illustration in the drawings in which, FIG. 1 is a front elevational view of the stationary film gate, showing the tapered guide fingers.

PREFERRED EMBODIMENT

Figure 1:
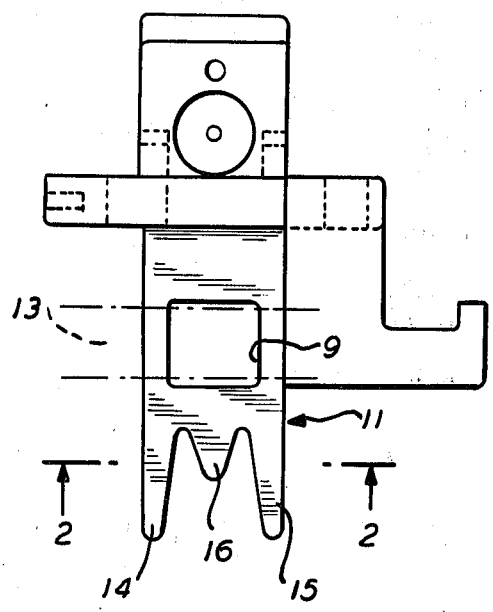
Figure 3:
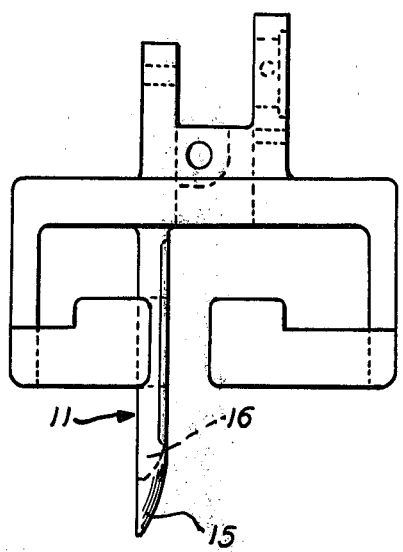
FIG. 3 is a side view of the stationary film gate showing the tapered guide fingers.
Figure 2:
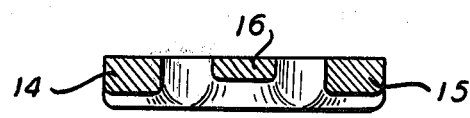
FIG. 2 is a cross sectional view of the tapered guide fingers taken on line 2—2 of FIG. 1, looking in the direction of the arrows.
Figure 4:
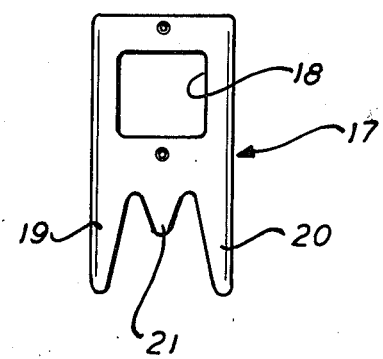
FIG. 4 is a front elevational view of the movable portion of the film gate showing the arcuate guide fingers.
Figure 5:
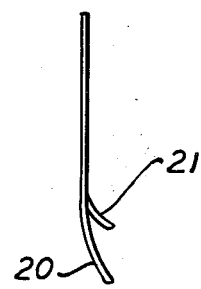
FIG. 5 is a side elevational view of the arcuate guide fingers.

Referring to the drawings now in detail, the invention disclosed therein contemplates a projection station which includes generally a stationary film gate 11, and a movable film gate 17 complementary therewith, which will be hereinafter referred to in detail. It will be noted that the patented cassette previously referred to is one in which the film frame is projected from within the cassette, and therefore it is necessary for the film gate to enter the cassette and to hold the film in the desired projection plane within the cassette. Accordingly, the cassette 31 is moved to the stationary film gate 11 and that stationary film gate 11 enters the appropriate aperture 10 in the cassette in general parallelism to the normal plane of the film 13 in the cassette 31. There are openings 12 for a light beam, to pass through the cassette and similar openings 9 in the stationary film gate 11. On the stationary gate 11, there are a pair of outer spaced guide fingers 14, 15 which approach the film as the cassette moves toward the projection station. The spaced guide fingers 14, 15 are complemented by a middle guide finger 16 on the stationary gate 11, which middle guide finger 16 is positioned between the pair of outer guide fingers 14, 15. The middle guide finger 16 on the stationary gate 11 is shorter than the pair of outer guide fingers 14, 15. The guide fingers 13, 14 taper in height progressively away from the plane defined by the stationary gate 11. It will be apparent that as the film moves edgewise toward the stationary gate 11, if the film has departed from the normal position represented by the focal plane, it will be cammed toward the focal plane. Without the guide fingers 14, 15, 16, the side of the film gate 11 would possible encounter the film strip 20 and be damaged. However, with the guide fingers 14, 15, 16, the film which has limply sagged away from the normal focal plane encounters the longer guide fingers 14, 15 which taper toward the focal plane and the film strip is cammed toward the focal plane. The middle finger 16 being shorter, encounters the film strip 13 which has been partially cammed toward the focal plane and further cams the center portion of the film toward the focal plane.

Generally spaced opposite to the stationary gate 11, there is a movable gate 17 capable of moving to and from the stationary gate 11. The movable gate 17 likewise has an opening 18 for a light beam to pass through. This opening 18 is in registration with the opening 12 in the stationary gate 11. On the movable gate 17 at the opposite end from the opening 18, there are a pair of spaced outer guide fingers 19, 20. Between the outer guide fingers 19, 20 there is a middle shorter guide finger 21. These guide fingers 19, 20, 21 on the movable gate 17 are arcuate, extending from the movable gate 17 and away from the focal plane. The outer guide fingers 19, 20 and the shorter middle guide finger 21 are deflected outwardly away from the focal plane. In the absence of the fingers 19, 20, 21 on the movable gate 17, the limp film 13 might have been deflected sufficiently away from the normal focal plane that it would encounter the side of the movable gate 15 as the cassette moves toward the stationary and movable gates 11, 17 in which case the film would be damaged. The arcuate guide fingers 19, 20, 21 arcuately encounter any portion of the film which may have been positioned beyond the focal plane which is between the stationary gate 11 and the movable gate 17. As the film moves edgewise toward the projection station, the arcuate guide fingers will deflect it toward the focal plane and prevent it from being engaged by the edges of the gate 17. When the film has reached the projection station between the stationary gate 11 and the movable gate 17 solenoid 22 causes the movable film gate 17 to move toward the stationary gate 11 thereby capturing the film in the precise focal plane for projection. By virtue of the complementary guides on the stationary end movable film gates, the system of projecting a frame from inside of a cassette 31 becomes practicable to operate without film damage. The solenoid 22 is the preferable means for moving the movable gate 17 into capturing engagement with the stationary gate 11. Without the guide fingers 14, 15, 16, 19, 20, 21, it is not practicable to utilize the leader pin referred to in U.S. Patent 4,027,832, or an improvement thereof, unless a stiff leader strip is first attached to the film strip 13 for the film 13 would be damaged during movement toward the projection station without an attached stiff leader strip that would keep the film entirely in the focal plane. However with the guide fingers 14, 15, 16, 19, 20, 21, stiff leader strips become unnecessary. The easily attachable leader pins can be applied directly to the end of the film.

Any suitable means to move the stationary film gate 17 may be used. There has been shown as an example, a lever 23 mounted pivotable on a stationary axle 24. One end of the lever 23 is pivotably attached by a pin 29 to the solenoid 22. The other end of the lever 23 is rigidly attached to the movable gate 17. The same end of the lever 23 is pivotably attached to a lever 25 which carries an idler roller 26, which rolls on the surface 27. A spring 28 normally urges the idler 26 into contact with the surface 27. This keeps the movable gate 17 in general parallelism with the stationary gate 11.

Figure 6:
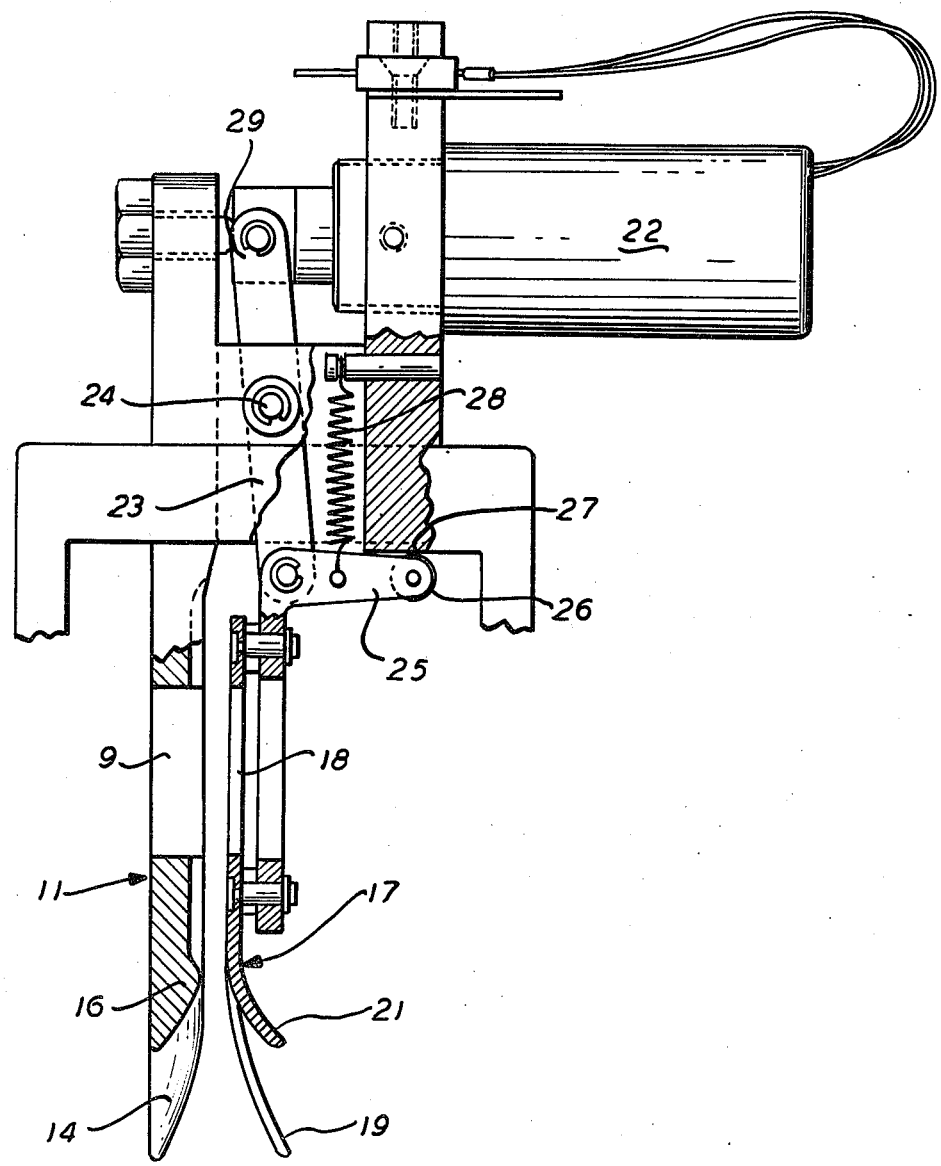
FIG. 6 is a side elevational view of the film gate assembly.
Figure 7:
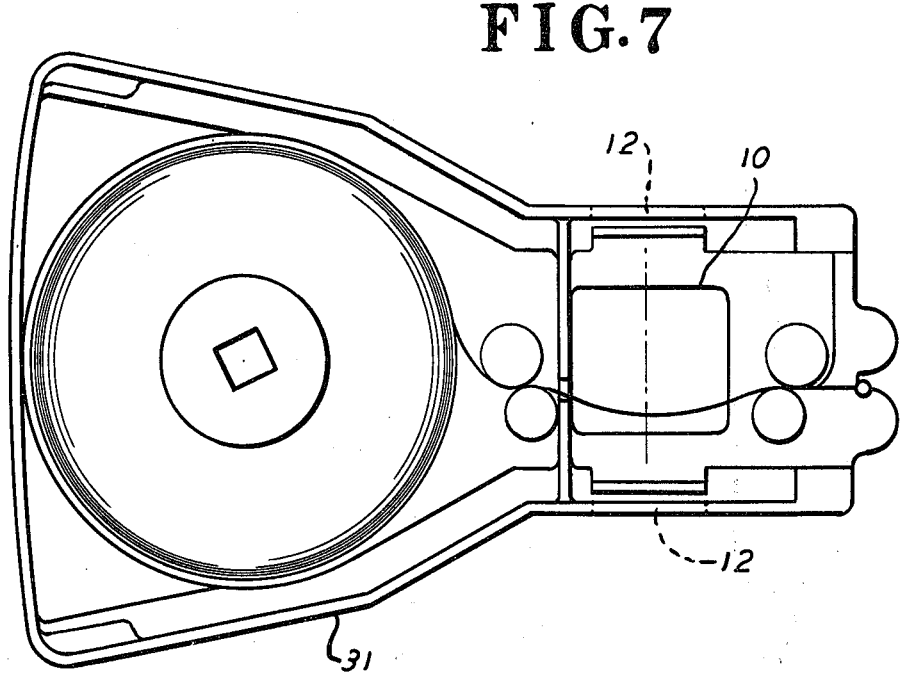
FIG. 7 is a top plan view of a cassette with the cover removed showing a limp film strip not lying in the focal plane
Figure 8:
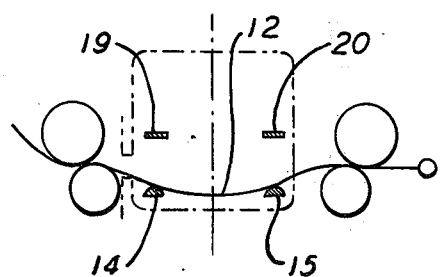
FIG. 8 is a view showing the film strip encountering the tapered guides of the stationary portion of the film gate.
Figure 9:
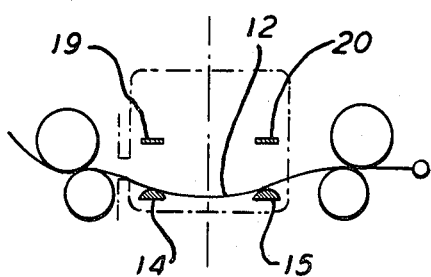
FIG. 9 is a view of the film strip being cammed toward the focal plane by the guides on the stationary portion of the gate.
Figure 10:
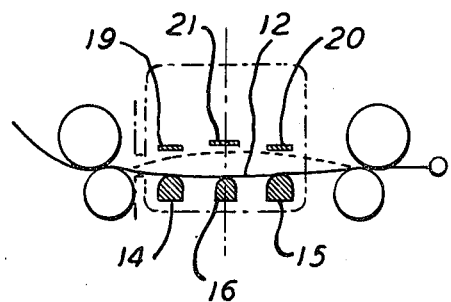
FIG. 10 is a view of the film strip cammed into substantial coincidence with the focal plane, and the arcuate fingers on the movable portion of the film gate moved toward the film strip.

The film gate operates in the following manner. The film gate, composed of stationary gate 11, and the movable gate 17 is disposed in a vertical position as shown in FIG. 6, and the gates 11 and 17 spaced apart to receive the leaderless film 12 still entirely within the cassette 31. The cassette 31 is disposed in a horizontal position, with the film 12 in a generally vertical plane. The cassette 31 moves to receive the stationary film gate in the orifice 10; there is a corresponding orifice in the lid, which has been removed and is not shown in the drawing. The tapered guide fingers 14, 15, 16 encounter the film 12 in the cassette and cam it toward the focal plane. The gate guide fingers 19, 20, 21 also may perform a similar function depending on the position of the film 12. When the cassette 31 reaches the projection station, the solenoid 22 moves the movable gate 17 and the stationary gate 11, so that it is in registration with the projection openings 12, 12 in the cassette and the projection openings 9, 18 in the stationary and movable gates 11, 17. The film may then be projected, and has suffered no damage in transit.

What is claimed:

1. A film gate and cassette for projecting a film comprising,
    a. a cassette for holding a reel of film,
    b. a film gate passage in the cassette for receiving a film gate when the cassette is moved to the film gate which is normally entirely outside of the cassette in a fixed position spaced away from the cassette,
    c. a film gate comprising,
        (A) a stationary gate,
        (B) an opening for a light beam at one end of the stationary gate,
        (C) a plurality of guide fingers on the stationary gate for guiding a film into the gate,
        (D) a movable gate opposite to the stationary gate,
        (E) an opening for a light beam at one end of the movable gate, and in registration with the opening in the stationary gate,
        (F) a plurality of guide fingers on the movable gate for guiding a film into the gate,
    d. a film on a reel in the cassette,
    e. a portion of the film in the cassette extending unsupported across the film gate passage in the cassette,
    f. the plurality of guide fingers on the movable and fixed portions of the film gate, engageable with the portion of the film extending unsupported across the film gate passage in the cassette, for guiding the unsupported portion of the film into position between the movable and fixed portions of the film gate,
    g. means to move the movable portion of the film gate toward the fixed portion of the film gate to hold a portion of the film in a focal plane for projection,
    h. the cassette movable to receive the film gate into its film gate passage as the unsupported portion of the film is cammed by at least some of the guide fingers into the focal plane between the fixed and movable portions of the film gate,
    i. a pair of light passages in the cassette in registration with each other to permit a beam of light to pass from outside of the cassette through and out of the cassette,
    j. the openings in the film gate and the light passages in the cassette positioned in registration with each other when the cassette has received the film gate.

2. A film gate and cassette for projecting a film according to claim 1 wherein the means to move the movable portion of the film gate toward the fixed portion of the film gate is a solenoid.

* * * * *